March 29, 1960  R. S. KLANG ET AL  2,930,426
EQUIPOTENTIAL WIRE BREAKER
Filed Aug. 23, 1957  2 Sheets-Sheet 1
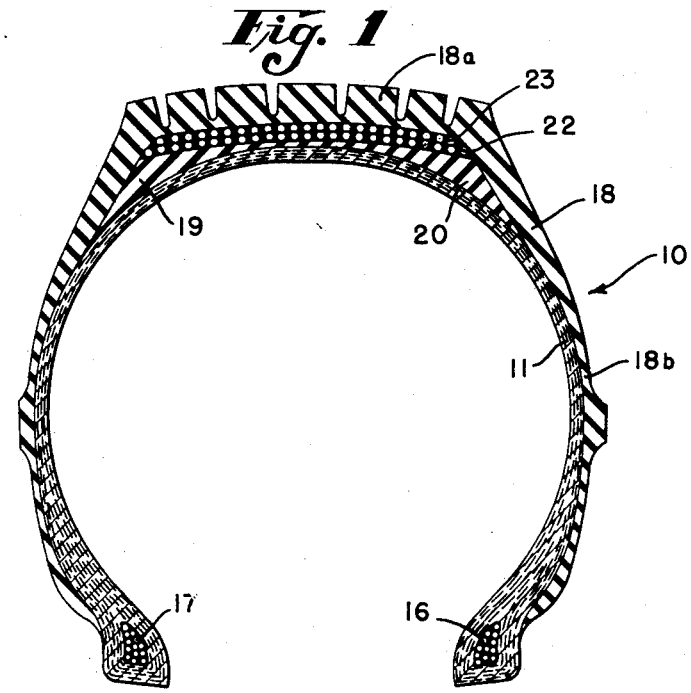
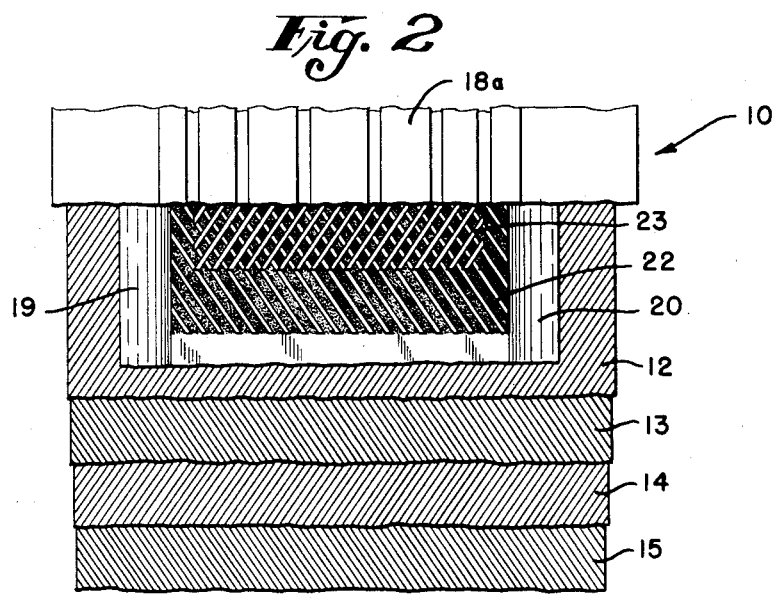
INVENTORS
ROBERT S. KLANG
HERBERT B. HINDIN
WILLIAM H. HULSWIT, JR.
BY
*James J. Long*
AGENT

INVENTORS
ROBERT S. KLANG
HERBERT B. HINDIN
BY WILLIAM H. HULSWIT, JR.

*James J. Long*
AGENT

United States Patent Office 2,930,426
Patented Mar. 29, 1960

2,930,426

EQUIPOTENTIAL WIRE BREAKER

Robert S. Klang, Cuyahoga Falls, Ohio, and Herbert B. Hindin, Grosse Pointe Woods, and William H. Hulswit, Jr., Grosse Pointe Farms, Mich., assignors to United States Rubber Company, New York, N.Y., a corporation of New Jersey Application August 23, 1957, Serial No. 679,872

2 Claims. (Cl. 152—361)

This invention relates to pneumatic tires, and in particular to equi-potential wire breakers incorporated in such tires for the purpose of eliminating radio static.

One of the problems which has troubled the tire and automobile industries, especially with the advent of higher and higher driving speeds, is the reception of motion-induced static in car radios even though these, when bench-tested, are found to be in perfect condition. Although the cause of this problem is not entirely clear, it has been suggested that, due to the effects of both external and internal friction, electrostatic charges tend to build up on the tires, which charges, upon becoming sufficiently great, result in a spark discharge, thereby producing the aforesaid radio static. Inasmuch as the rate of charge build-up appears to depend to a considerable extent on the speed of rotation of the tires on a car, it can be understood that the static will become highly evident and objectionable at almost all speeds above those corresponding to the lower gears.

In U.S. Patent No. 2,786,507, issued to H. S. Howe et al. on March 26, 1957, there is disclosed a number of pneumatic tires constructed and designed to offer enhanced resistance to shocks, wear and tear, rupture-producing influences, and the like. To this end there are provided between the tread portion of the tire and the subtread mass of rubber stock directly contacting the fabric carcass a plurality of layers, preferably two in number, of rubberized wire tire fabric, each layer in essence consisting of a plurality of adjacent, parallel wire elements or cables covered on each side with a thin stratum of vulcanizable rubber. The two so-called "breaker" plies of wire tire fabric are so disposed relative to one another that the wires of one ply extend at predetermined angle to the wires in the other ply, the angular relationship preferably being approximately the same as that existing between the fabric cords.

Quite unexpectedly, however, it has been found that a considerable percentage of the tires so constructed, although possessed of considerable rupture strength and improved wearing characteristics, not only fail to reduce radio static noticeably or to any level consonant with unobjectionable sound reproduction by the car radio, but actually result in more static than tires without any breakers at all. Although other explanations for this phenomenon may exist, the main reason appears to be that, since each layer of wires is encased in its own skim coat of rubber, the electrostatic charges building up on the wires of the two breaker plies are at different potentials, this ultimately leading to a spark gap discharge from one of the wire layers to the other through the thin strata of rubber insulation therebetween. This would become even more pronounced as the insulating strata become stretched, worn and possibly ruptured during continued use of the tires.

One of the principal objects of the present invention, therefore, is to provide means designed to overcome the above-noted disadvantages and objectionable static-producing characteristics of pneumatic tires.

Another important object of the present invention is to provide wire breaker-reinforced pneumatic tires with greatly enhanced radio static-inhibiting properties.

Still another object of the present invention is to provide breaker tires of the aforesaid static-inhibiting type which possess the same strength and durability characteristics and resistance to wear, groove cracking and penetration as heretofore known breaker tires, and the static-inhibiting properties of which do not tend to lessen materially as the tires are used and worn down.

A further object of the present invention is the provision of means, in automobile tires, capable of preventing spark gap discharges between wire breaker plies, to thereby reduce tire-generated radio static to a negligible level.

Accordingly, it is an object of the invention to provide means contributing to elimination of potential differences between two adjacent strata, to wit the breaker plies, of a tire at which electrostatic charges would normally tend to build up.

A related object of the invention is the provision of a pneumatic tire breaker which is so constructed as to admit of no charge build-up on any of its plies, and as to ensure maintenance of the various breaker plies at equal potentials throughout.

More specifically, the foregoing objects are preferably attained, in accordance with one embodiment of the present invention, by incorporating in the tire casing exteriorly of the fabric carcass a wire breaker consisting of at least two layers of wires, each layer being provided with a skim coat of rubber stock on only one side and being bare or exposed on the other side, and the two layers of wires being so positioned as to have their bare sides in contact with one another. The wires in each ply of the breaker are disposed substantially parallel to one another and at an angle or transveresly to the wires in the other ply.

The arrangement of the wires in this manner provides a multiplicity of contact points between all of the individual wires and, by thus placing them in electrical connection with one another, eliminates any possibility of a build-up of electrical energy even though the wire ends are spaced from each other and even if some of the wires break or the breaker plies separate partially during use of the tire. Stated in other words, the essence of this arrangement is that all points of a wire breaker so constructed are at one and the same potential (relative to some predetermined reference point), enabling any charge produced to be immediately leaked from one ply to the other. The charge is thus neutralized, its build-up and subsequent spark gap discharge inhibited, and production of radio static avoided.

The above and other objects and advantages of the present invention will be more fully understood by considering the following detailed description in conjunction with the accompanying drawings, in which:

Fig. 1 is a transverse sectional view of a pneumatic tire constructed in accordance with and illustrating the principles underlying the present invention;

Fig. 2 is a fragmentary plan view of a wire breaker-reinforced tire as shown in Fig. 1 and illustrating the various plies constituting the tire casing;

Figure 3:
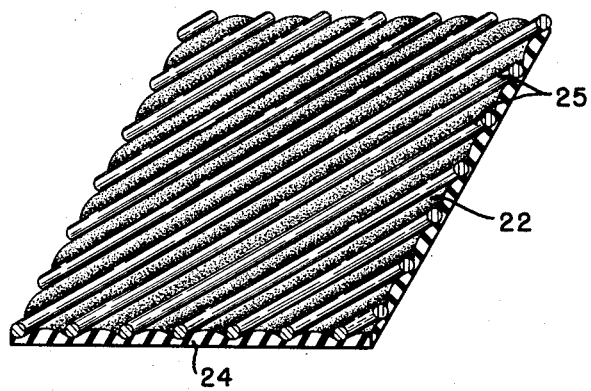
Fig. 3 is an isometric view of a wire breaker ply as used in implementing the present invention.

Referring now more particularly to Figs. 1 and 2, the pneumatic tire 10 there shown is, except as hereinafter set forth, constructed in a conventional manner and comprises a fabric carcass 11 consisting of four plies 12, 13, 14 and 15 of rubber-coated textile cord fabric, preferably nylon, the ends of which are lapped around annular wire bead assemblies 16 and 17. Surrounding the outer surface of the carcass 11 is the conventional tread 18a and sidewalls 18b. Two rubber contoured shoulder strips 19 and 20, which are positioned symmetrically on opposite sides of the crown center line of the carcass 11, and constitute the subtread portion of the tire. Located about the shoulder strips 19 and 20 between the carcass 11 and the tread 18a is a wire breaker 21 (see also Fig. 5) consisting, according to the invention, of two plies 22 and 23 of specially constructed wire tire fabric.

As may be seen from Fig. 3, the wire breaker ply 22 comprises essentially a layer of substantially parallel wires 25, one side of this layer being provided with a relatively thin skim coat 24 of vulcanizable rubber stock the skim coat 24 being bonded to the wires 25 in any suitable manner. The other side of the layer of wires 25 is left bare. The wires, which are not in side by side contact, may be spaced from each other so as to yield a number of ends per inch which is less than commonly found in the heretofore known wire tire fabrics. A wire spacing yielding about 15 ends per inch has been used successfully, and a wire spacing of about 7½ ends per inch with wires twice as thick as in the first case has shown satisfactory fabricating, handling and shaping characteristics to an even greater extent than the aforesaid 15 e.p.i. fabric. The second wire breaker ply 23 is constructed in exactly the same manner as the ply 22.

For use in any particular tire, the wire fabric from which the plies 22 and 23 are formed is bias cut so as to dispose the wires thereof at a predetermined angle relative to the longitudinal dimension of the fabric. This angle is so chosen that when the two plies 22 and 23 are superposed in "bare-back" relation on one another about the tire carcass 11, the wires 25 in the ply 22 extend transversely to the wires 27 in the ply 23 and form a predetermined angle, from about 25° to about 45°, with the crown center line of the tire.

Figure 4:
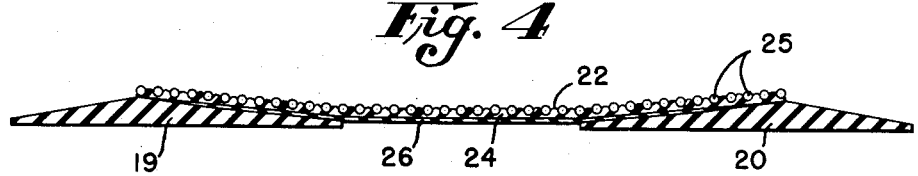
Fig. 4 is a transverse sectional view of a pair of contour shoulder strips having one breaker ply applied thereto.
Figure 5:
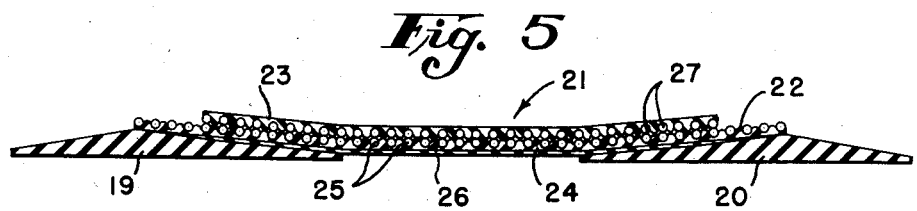
Fig. 5 is a similar sectional view showing the second breaker ply applied "bare-back" to the first breaker ply.
Figure 6:
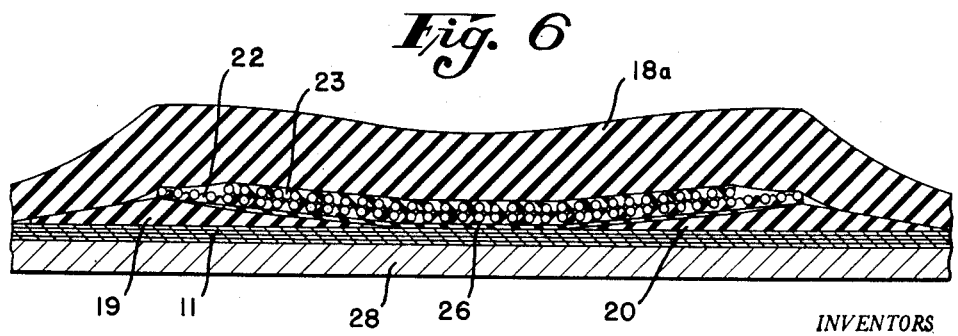
Fig. 6 is a sectional view of the tread portion of a completed tire casing including a two-ply wire breaker, on a building drum.

Referring now to Figs. 4, 5 and 6, the method of assembling the tire casing prior to vulcanization is carried out as follows:

In order to form the wire breaker, the previously shaped shoulder strips 19 and 20, made of conventional rubber stock, are accurately spaced or set apart (on a plane surface) a distance predetermined for the nominal size of the particular tire to be manufactured. These contour shoulder strips are then interconnected by an additional, relatively thin strip 26 of rubber, after which the first ply 22 is placed thereover and stitched thereto with its skim coat 24 facing the strip 26 and the bare side of the layer of wires 25 facing upwardly. The second ply 23 is now superposed onto the ply 22, with its bare side facing downwardly and contacting the upper bare side of the ply 22. The wires 25 and 27 thus cross one another at approximately right angles, although it will be appreciated that the angle of intersection may be less than a right angle. The second ply 23 is now stitched or otherwise fixedly connected to the first ply 22 so as to ensure that the wires 25 and 27 are in firm electrical contact with each other. The stitching or like operation tends to force some of the skim coat rubber into the spaces between the bare wires 25 and between the wires 27. This results in a better adhesion between the plies and anchoring of the wires in proper relation to one another without interfering with the "bare-back" contact therebetween.

The contour shoulder strips 19 and 20 with the attached strip 26 and wire breaker plies 22 and 23, as shown in Fig. 5, are now mounted on and stitched thoroughly to the carcass 11 which has previously been built up on a building drum 28 of the type conventionally employed in tire manufacture. It is to be noted that the above-mentioned extent of separation of the contour shoulder strips 19 and 20 is critical in that it ensures proper positioning of the breaker plies relative to the carcass center line so as to impart to the tire the desired strength and wearing characteristics, as shown in the aforesaid Howe et al. patent. The tread and sidewalls 18a and 18b are then applied and the completed tire carcass is shaped and vulcanized in the conventional manner.

Having thus described our invention, what we claim and desire to protect by Letters Patent is:

1. In a pneumatic tire, a textile cord fabric carcass, a rubber tread and sidewalls superimposed on said carcass, and a breaker assembly located between said tread and carcass, said breaker assembly comprising at least two separate continuous plies each including a layer of laterally spaced wires arranged in substantially the same plane, each of said layers of wires being provided with a skim coat of rubber on one side and being bare on the other side, said bare sides of said layers of wires being in electrical contact with one another, whereby the accumulation of electrostatic charges of large potential differences between said breaker plies is prevented and the production of radio static reduced to a negligible level.

2. In a pneumatic tire, a textile cord fabric carcass, a rubber tread and sidewalls superimposed on said carcass, and a breaker assembly located between said tread and carcass, said breaker assembly comprising at least two separate continuous plies each including a layer of laterally spaced wires arranged in substantially the same plane, each of said layers of wires being provided with a skim coat of rubber on one side and being bare on the other side, said layers of wires being superposed one on the other with the bare sides thereof contacting one another, and with the wires of one layer crossing the wires of the other layer, thereby providing a multiplicity of electrical contact points between the layers of wires, whereby the accumulation of electrostatic charges of large potential differences between said breaker plies is prevented and tire-generated radio static reduced to a negligible level.

References Cited in the file of this patent

UNITED STATES PATENTS

| | | |
|---|---|---|
| 591,873 | Wirt | Mar. 15, 1910 |
| 2,786,507 | Howe et al. | Mar. 26, 1957 |